United States Patent
Bae et al.

(10) Patent No.: US 11,432,279 B2
(45) Date of Patent: Aug. 30, 2022

(54) METHOD FOR TRANSMITTING TRANSPORT BLOCK BY USING DOWNLINK CONTROL INFORMATION IN WIRELESS COMMUNICATION SYSTEM AND APPARATUS THEREFOR

(71) Applicant: LG ELECTRONICS INC., Seoul (KR)

(72) Inventors: Duckhyun Bae, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 17/047,050

(22) PCT Filed: Apr. 11, 2019

(86) PCT No.: PCT/KR2019/004345
§ 371 (c)(1),
(2) Date: Oct. 12, 2020

(87) PCT Pub. No.: WO2019/199070
PCT Pub. Date: Oct. 17, 2019

(65) Prior Publication Data
US 2021/0160826 A1    May 27, 2021

(30) Foreign Application Priority Data
Apr. 13, 2018 (KR) .................. 10-2018-0043504

(51) Int. Cl.
*H04W 72/04* (2009.01)
*H04L 1/00* (2006.01)

(52) U.S. Cl.
CPC ........... *H04W 72/042* (2013.01); *H04L 1/001* (2013.01); *H04L 1/0004* (2013.01); *H04W 72/044* (2013.01)

(58) Field of Classification Search
CPC .... H04W 72/042; H04W 72/044; H04L 1/00; H04L 1/0004; H04L 1/001; H04L 1/0016; H04L 1/1819; H04L 5/00
See application file for complete search history.

(56) References Cited

U.S. PATENT DOCUMENTS

| | | | |
|---|---|---|---|
| 11,102,786 B2 * | 8/2021 | Salem | H04L 1/1671 |
| 11,184,924 B2 * | 11/2021 | Yang | H04L 1/1819 |

(Continued)

FOREIGN PATENT DOCUMENTS

| | | | | |
|---|---|---|---|---|
| CN | 108111275 A | * | 6/2018 | ........... H04L 5/0057 |
| EP | 3780720 A1 | * | 2/2021 | ........... H04L 5/0064 |
| WO | WO-2015100690 A1 | * | 7/2015 | ........... H04L 1/0016 |

OTHER PUBLICATIONS

F. Hamidi-Sepehr, A. Nimbalkerand G. Ermolaev, "Analysis of 5G LDPC Codes Rate-Matching Design," 2018 IEEE 87th Vehicular Technology Conference (VTC Spring), 2018, pp. 1-5, doi: 10.1109/VTCSpring.2018.8417496. (Year: 2018).*

(Continued)

*Primary Examiner* — Chi H Pham
*Assistant Examiner* — Vladislav Y Agureyev
(74) *Attorney, Agent, or Firm* — Lee Hong Degerman Kang Waimey

(57) ABSTRACT

The present specification provides a method for transmitting a transport block (TB) by using downlink control information (DCI) in a wireless communication system. In particular, the method, performed by a terminal, comprises: receiving first DCI from a base station; selecting a modulation and coding scheme (MCS) table, on the basis of the first DCI; calculating a first transport block size (TBS), on the basis of at least one of a format of the first DCI and the selected MCS table; and transmitting, to the base station, a first TB according to the calculated first TBS, wherein the first TBS (Continued)

is the same as a second TBS of a second TB transmitted before the transmission of the first TB.

15 Claims, 9 Drawing Sheets

(56) References Cited

U.S. PATENT DOCUMENTS

| | | | |
|---|---|---|---|
| 2014/0153484 A1* | 6/2014 | Kim | H04L 27/34 |
| | | | 370/328 |
| 2014/0313985 A1 | 10/2014 | Nimbalker et al. | |
| 2018/0219649 A1* | 8/2018 | Ying | H04L 1/1819 |
| 2018/0279315 A1* | 9/2018 | Salem | H04L 1/1671 |
| 2019/0044646 A1* | 2/2019 | Xu | H04L 27/36 |
| 2019/0082450 A1* | 3/2019 | Ying | H04W 72/1268 |
| 2019/0149365 A1* | 5/2019 | Chatterjee | H04L 5/0044 |
| | | | 370/329 |
| 2019/0159197 A1* | 5/2019 | Shrestha | H04W 72/0413 |
| 2019/0222360 A1* | 7/2019 | Nam | H04W 28/06 |
| 2019/0229841 A1* | 7/2019 | Sandberg | H03M 13/116 |
| 2019/0349115 A1* | 11/2019 | Lin | H04L 1/0007 |
| 2020/0037317 A1* | 1/2020 | Guo | H04L 1/0003 |
| 2020/0052861 A1* | 2/2020 | Li | H04L 5/0057 |
| 2020/0153538 A1* | 5/2020 | Chen | H04L 1/0023 |
| 2020/0235759 A1* | 7/2020 | Ye | H03M 13/09 |
| 2021/0014860 A1* | 1/2021 | Wang | H04L 1/0025 |
| 2021/0144738 A1* | 5/2021 | Yoshioka | H04W 72/1278 |
| 2021/0211930 A1* | 7/2021 | Larsson | H04L 1/0003 |
| 2021/0266953 A1* | 8/2021 | Pelletier | H04L 5/0044 |

OTHER PUBLICATIONS

PCT International Application No. PCT/KR2019/004345, International Search Report dated Aug. 13, 2019, 3 pages.
LG Electronics, "Discussion on resource allocation and TBS determination," 3GPP TSG RAN WG1 Meeting 91, R1-1719929, Reno, USA, Nov. 27-Dec. 1, 2017, 16 pages.
Spreadtrum Communications, "TBS calculation for small packet sizes," 3GPP TSG RAN WG1 Meeting AH 1801, R1-1800276, Vancouver, Canada, Jan. 22-26, 2018, 9 pages.
Huawei et al., "Resource allocation and TBS," 3GPP TSG RAN WG1 Meeting #91, R1-1719381, Reno, USA, Nov. 27-Dec. 1, 2017, 16 pages.
ZTE et al., "NR compact DCI format for URLLC," 3GPP TSG RAN WG1 Meeting #92bis, R1-1803801, Sanya, China, Apr. 16-20, 2018, 7 pages.

* cited by examiner

[FIG. 1]
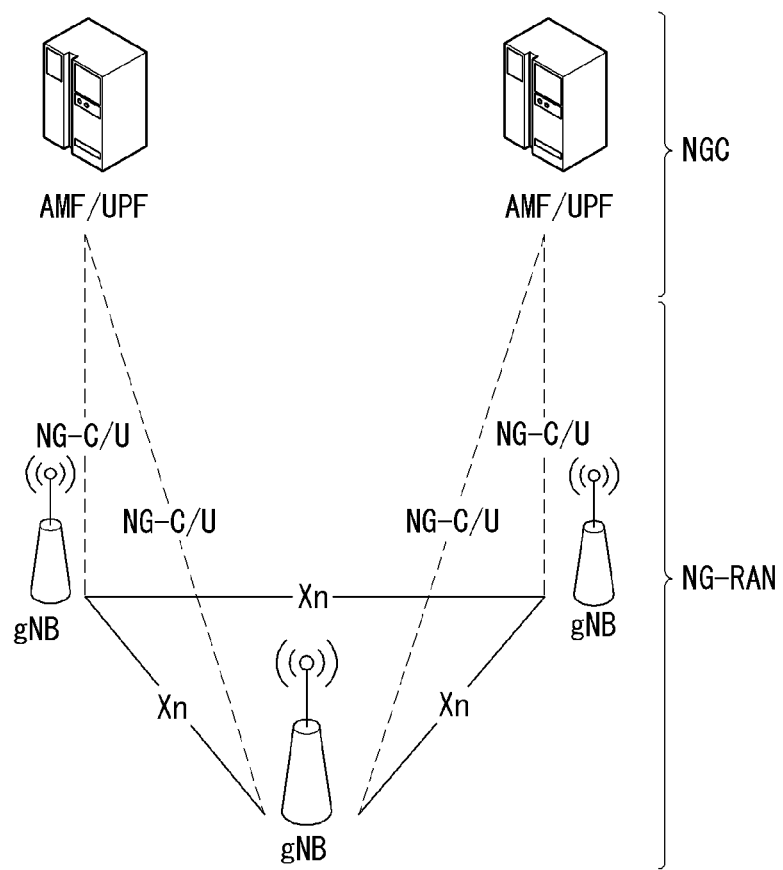

[FIG. 2]
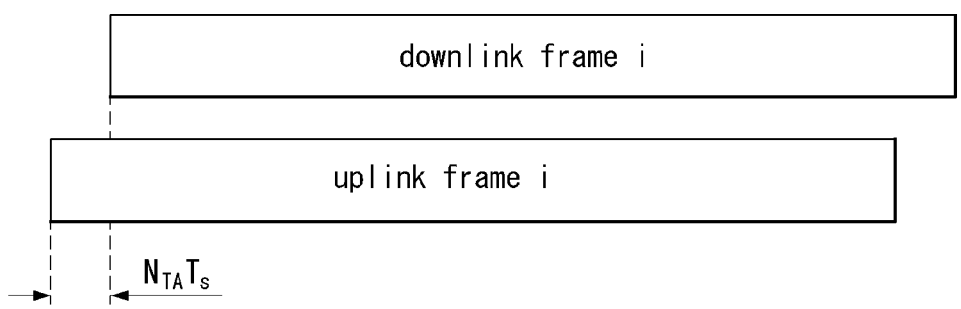

[FIG. 3]
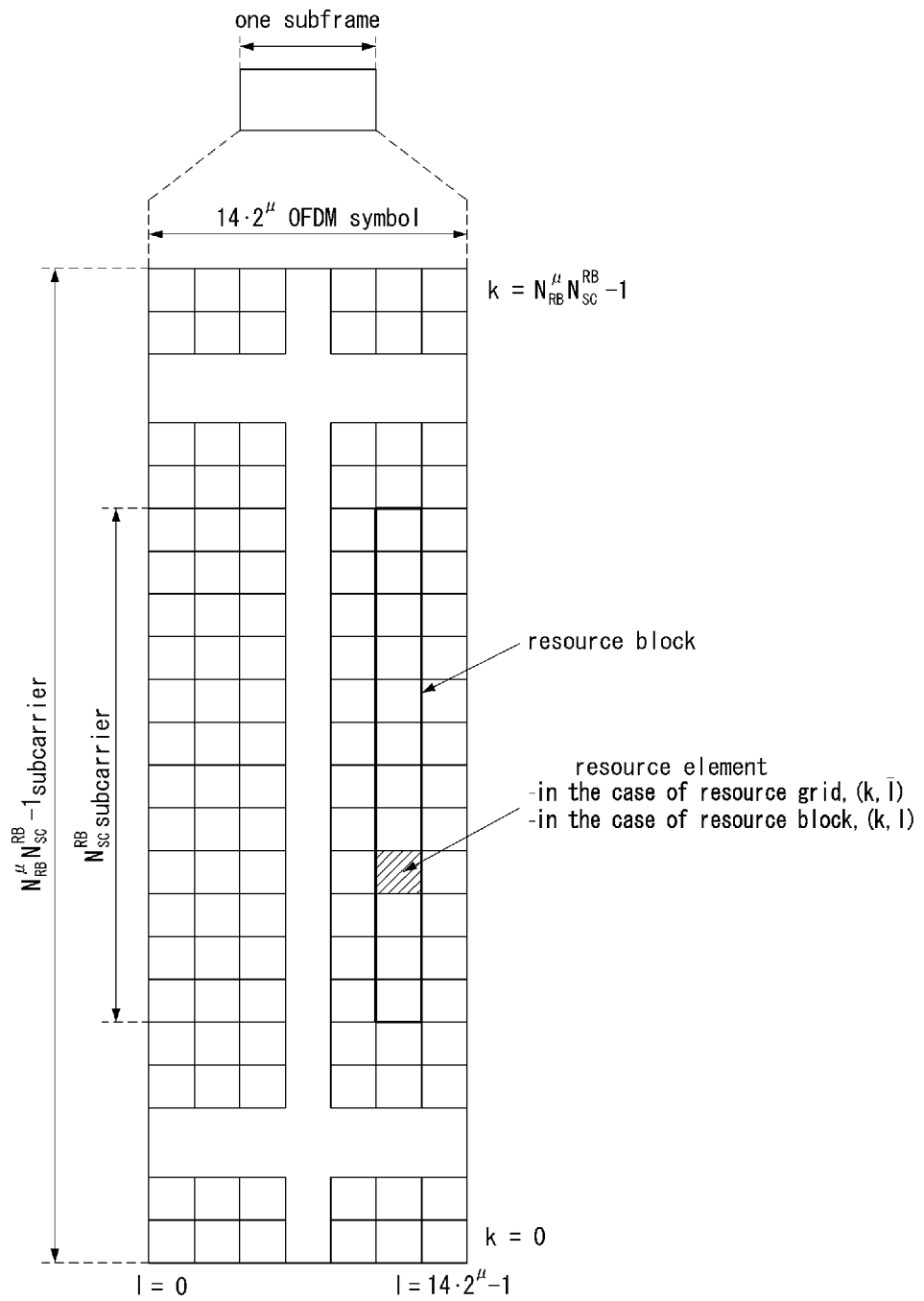

[FIG. 4]
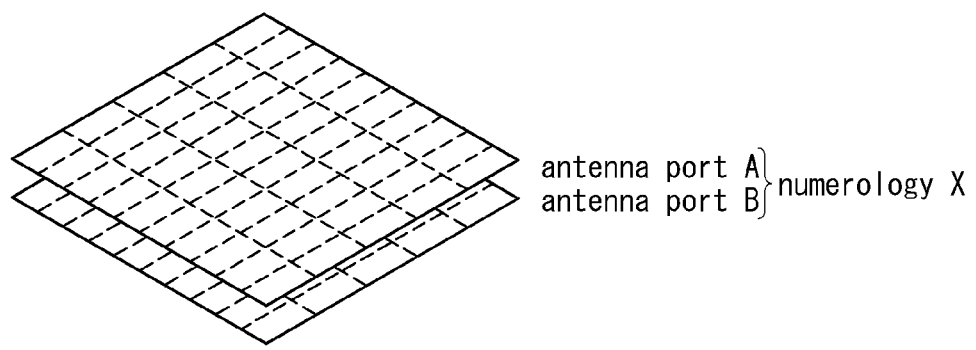
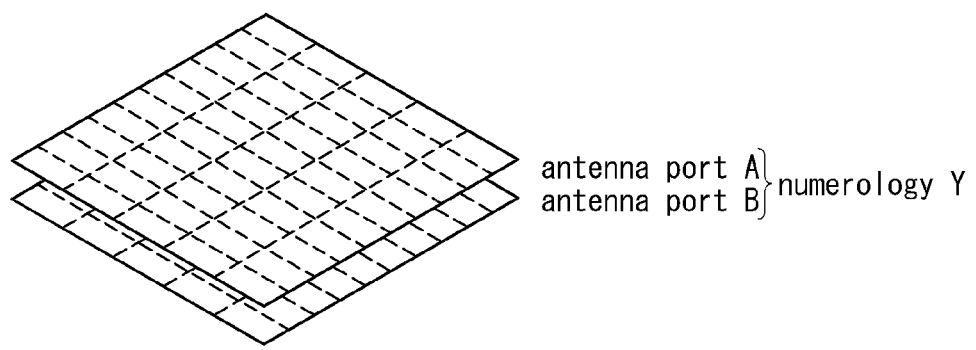

[FIG. 5]
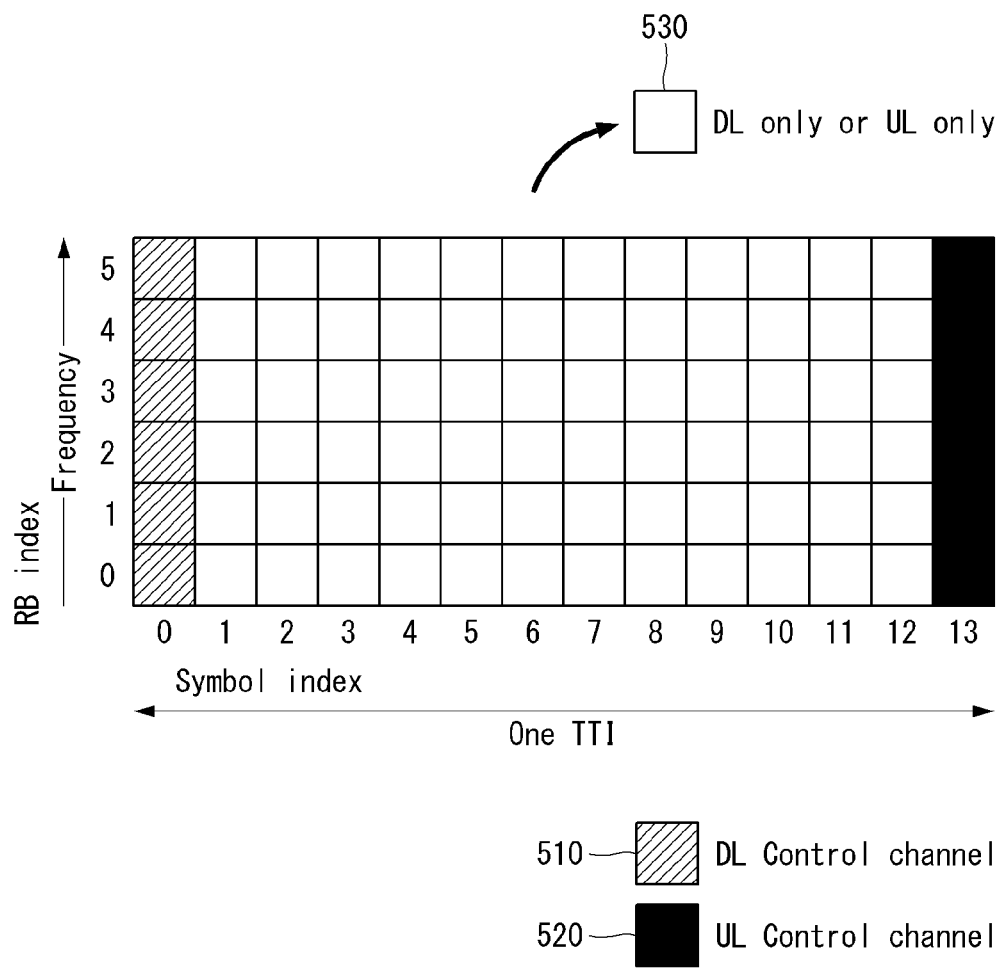

[FIG. 6]
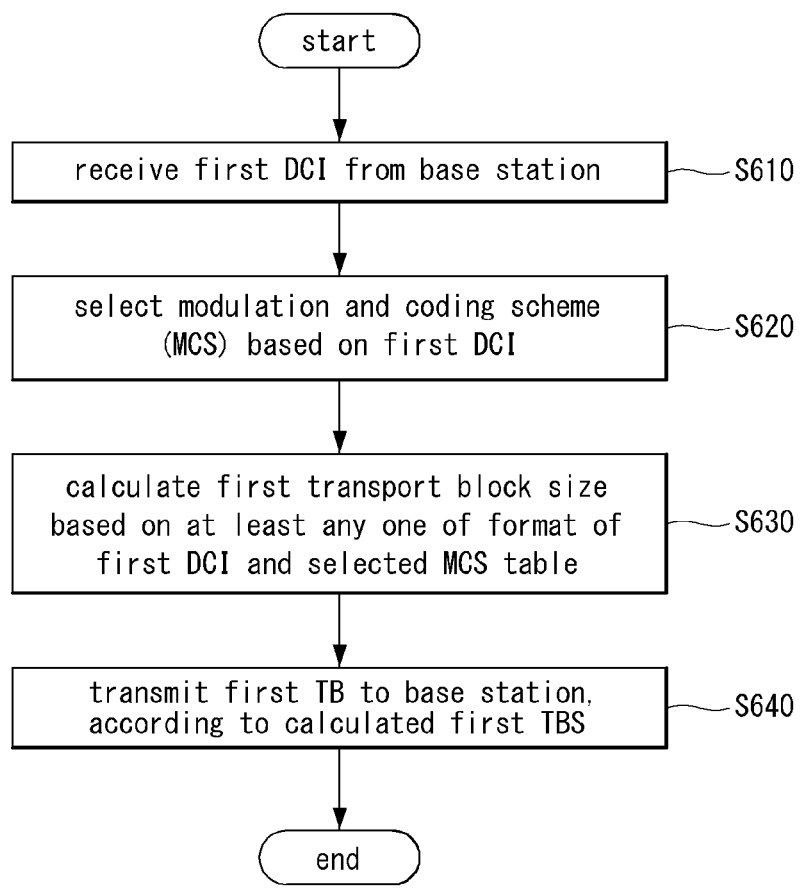

[FIG. 7]
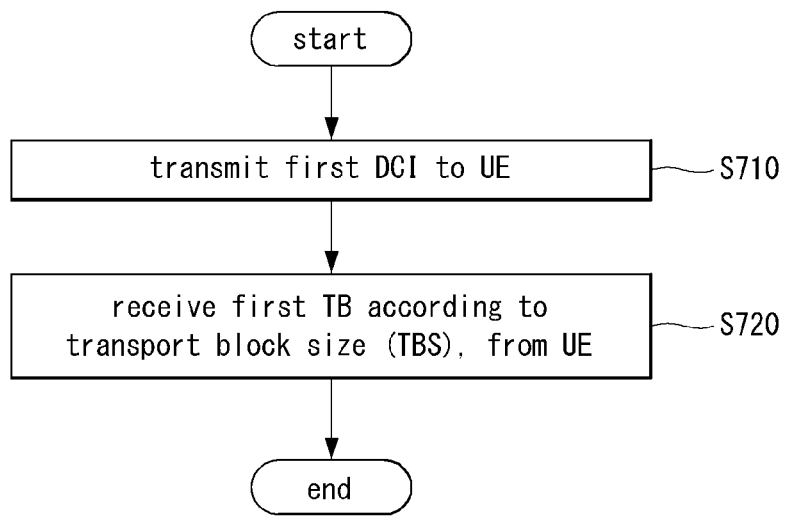

[FIG. 8]
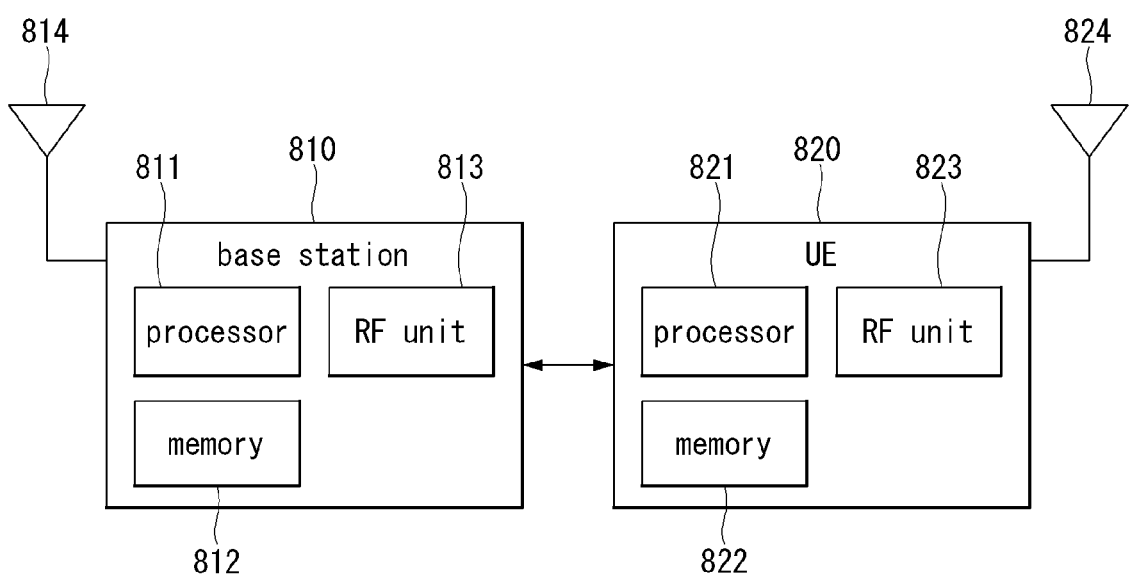

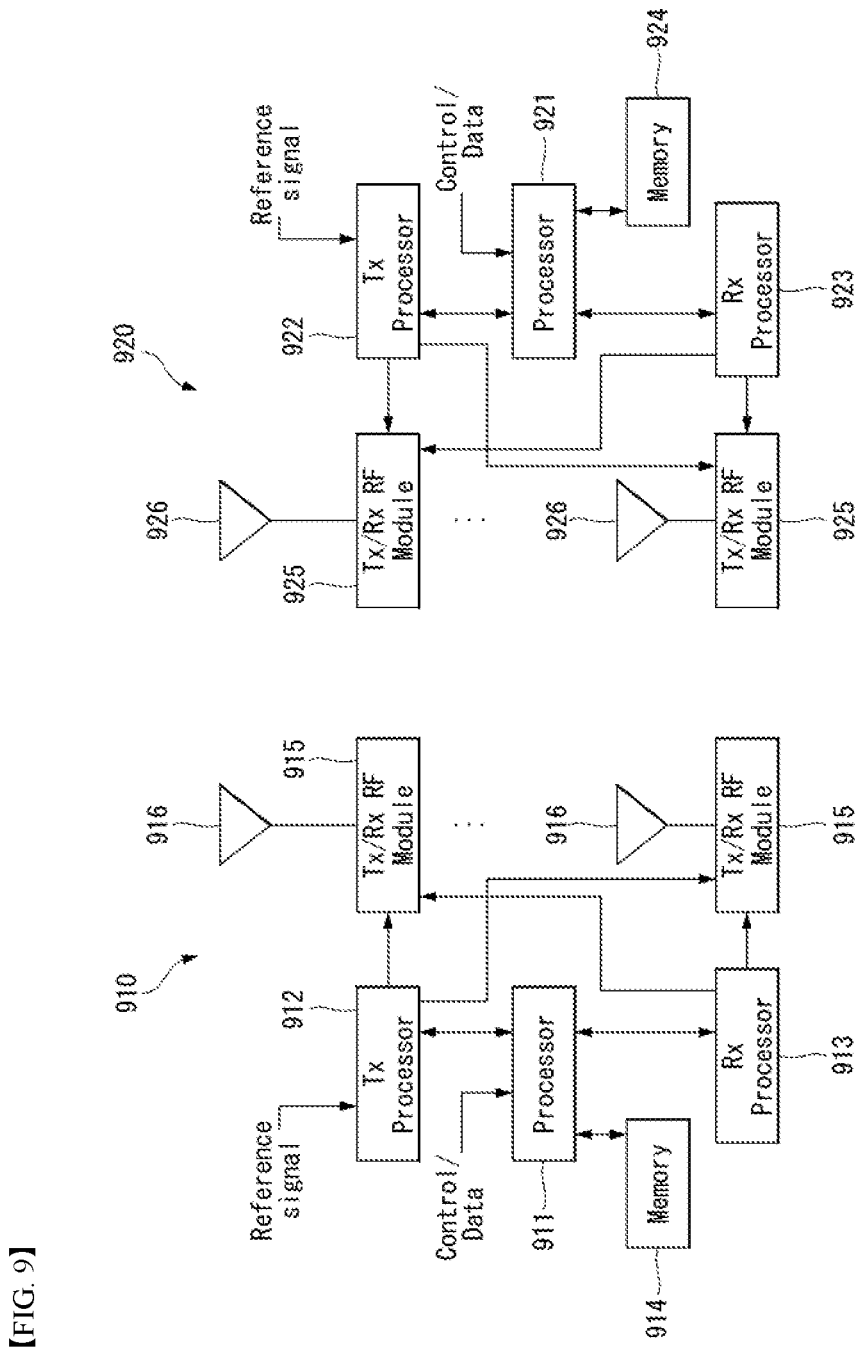
[FIG. 9]

METHOD FOR TRANSMITTING TRANSPORT BLOCK BY USING DOWNLINK CONTROL INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/004345, filed on Apr. 11, 2019, which claims the benefit of earlier filing date and right of priority to Korean Application No. 10-2018-0043504, filed on Apr. 13, 2018, the contents of which are all hereby incorporated by reference herein in their entirety.

TECHNICAL FIELD

The disclosure relates to wireless communication systems, and more particularly, to a method for transmitting a transport block using downlink control information and a device supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE DISCLOSURE

Technical Problem

The disclosure aims to provide a method for determining a modulation and coding scheme table and transport block size using downlink control information.

The disclosure also aims to provide a method for determining a base graph using downlink control information.

Objects of the disclosure are not limited to the foregoing, and other unmentioned objects would be apparent to one of ordinary skill in the art from the following description.

Technical Solution

According to the disclosure, there is provided a method for transmitting a transport block (TB) using downlink control information (DCI) in a wireless communication system.

Specifically, the method performed by a user equipment (UE) comprises receiving a first DCI from a base station, selecting a modulation and coding scheme (MCS) table based on the first DCI, calculating a first transport block size (TBS) based on at least one any one of a format of the first DCI and the selected MCS table, and transmitting a first TB to the base station according to the calculated first TBS. The first TBS is identical to a second TBS of a second TB transmitted before the first TB is transmitted.

Further, in the disclosure, the first DCI includes a field indicating the MCS table. The MCS table is selected based on the field.

Further, in the disclosure, the field indicating the MCS table is joint-coded with a redundancy version (RV).

Further, in the disclosure, a format of the first DCI is identical to a format of a second DCI transmitted for transmitting the second TB. The second DCI is transmitted before the first DCI is transmitted.

Further, in the disclosure, calculating the first TBS includes selecting a quantization method based on a predetermined criterion and calculating the first TBS using the selected quantization method.

Further, in the disclosure, the predetermined criterion is set based on an information bit size.

Further, in the disclosure, the information bit size is larger than 3,824 bits.

According to the disclosure, a UE transmitting a transport block (TB) using downlink control information (DCI) in a wireless communication system comprises a radio frequency (RF) module for transmitting/receiving a radio signal and a processor functionally connected with the RF module. The processor receives a first DCI from a base station, selects a modulation and coding scheme (MCS) table based on the first DCI, calculates a first transport block size (TBS) based on at least one any one of a format of the first DCI and the selected MCS table, and transmits a first TB to the base station according to the calculated first TBS. The first TBS is identical to a second TBS of a second TB transmitted before the first TB is transmitted.

Further, in the disclosure, the first DCI includes a field indicating the MCS table. The MCS table is determine based on the field.

Further, in the disclosure, the field indicating the MCS table is joint-coded with a redundancy version (RV).

Further, in the disclosure, a format of the first DCI is identical to a format of a second DCI transmitted for transmitting the second TB. The second DCI is transmitted before the first DCI is transmitted.

Further, in the disclosure, the processor selects a quantization method based on a predetermined criterion and calculates the first TBS using the selected quantization method.

Further, in the disclosure, the predetermined criterion is set based on an information bit size.

Further, in the disclosure, the information bit size is larger than 3,824 bits.

According to the disclosure, a method for receiving a transport block (TB) using downlink control information (DCI) in a wireless communication system is performed by a base station and comprises transmitting a first DCI to a UE and receiving, from the UE, a first TB according to a first transport block size (TBS). The first TBS is calculated based on at least any one of a format of the first DCI and a modulation and coding scheme (MCS) table selected based on the first DCI. The first TBS is identical to a second TBS of a second TB received from the UE before the first TB is received.

Advantageous Effects

The disclosure provides a method for determining a modulation and coding scheme table and transport block size using downlink control information, thereby maintaining the same modulation and coding scheme table and transport block size.

The disclosure is also able to keep the base graph between initial transmission and retransmission constant, using downlink control information.

Effects of the disclosure are not limited to the foregoing, and other unmentioned effects would be apparent to one of ordinary skill in the art from the following description.

BRIEF DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall NR system structure to which a method described in the disclosure is applicable.

FIG. 2 illustrates a relationship between an uplink frame and a downlink frame in a wireless communication system to which a method described in the disclosure is applicable.

FIG. 3 illustrates an example of a resource grid supported in a wireless communication system to which a method described in the disclosure is applicable.

FIG. 4 illustrates examples of a resource grid per antenna port and numerology to which a method described in the disclosure is applicable.

FIG. 5 illustrates an example of a self-contained structure to which a method described in the disclosure is applicable.

FIG. 6 is a flowchart illustrating a method of operation of a UE performing a method for transmitting a transport block as proposed in the disclosure.

FIG. 7 is a flowchart illustrating a method of operation of a base station performing a method for receiving a transport block as proposed in the disclosure.

FIG. 8 is a block diagram illustrating a configuration of a wireless communication device to which methods proposed in the disclosure are applicable.

FIG. 9 is a block diagram illustrating another example configuration of a wireless communication device to which methods proposed according to the disclosure are applicable.

MODE FOR CARRYING OUT THE DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)" may be interchangeably used with the term "fixed station", "Node B", "eNB (evolved-NodeB)", "BTS (base transceiver system)", "AP (Access Point)", or "gNB (general NB, generation NB)". "Terminal" may refer to a stationary or mobile device and may be interchangeably used with the term "UE (User Equipment)", "MS (Mobile Station)", "UT (user terminal)", "MSS (Mobile Subscriber Station)", "SS (Subscriber Station)", "AMS (Advanced Mobile Station)", "WT (Wireless terminal)", "MTC (Machine-Type Communication) device", "M2M (Machine-to-Machine) device", or "D2D (Device-to-Device) device".

Hereinafter, downlink (DL) means communication from a base station to a UE, and uplink (UL) means communication from a UE to a base station. For downlink, a transmitter may be part of a base station, and a receiver may be part of a UE. For uplink, a transmitter may be part of a UE, and a receiver may be part of a base station.

The terminology used herein is provided for a better understanding of the disclosure, and changes may be made thereto without departing from the technical spirit of the disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA (evolved UTRA). UTRA is part of UMTS (universal mobile telecommunications system). 3GPP (3rd generation partnership project) LTE (long term evolution) is part of E-UMTS (evolved UMTS) using E-UTRA and adopts OFDMA for downlink and SC-FDMA for uplink. LTE-A (advanced) is an evolution of 3GPP LTE.

The 5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

The 5G NR supports various subcarrier spacings and supports CP-OFDM on downlink and CP-OFDM and DFT-s-OFDM (SC-OFDM) on uplink.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the disclosure may be supported by the above documents. All the terms disclosed herein may be described by the standard documents.

For the clear description, embodiments of the disclosure will be described focusing on 3GPP LTE/LTE-A/New Radio (NR), but the technical features of the disclosure are not limited thereto.

In the disclosure, 'A/B' or 'A and/or B' can be interpreted in the same sense as 'including at least one of A or B'.

Terminology eLTE eNB: The eLTE eNB is the evolution of eNB that supports connectivity to EPC and NGC.

gNB: Anode which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Numerology: The numerology corresponds to one subcarrier spacing in a frequency domain. By scaling a reference subcarrier spacing by an integer N, different numerologies can be defined.

NR: NR Radio Access or New Radio

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 2 represents the number of OFDM symbols per slot for a normal CP in the numerology μ, and Table 3 represents the number of OFDM symbols per slot for an extended CP in the numerology μ.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |

TABLE 2-continued

| | | Slot configuration | | | | |
| --- | --- | --- | --- | --- | --- | --- |
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 4 | 14 | 160 | 16 | — | — | — |
| 5 | 14 | 320 | 32 | — | — | — |

TABLE 3

| | | Slot configuration | | | | |
| --- | --- | --- | --- | --- | --- | --- |
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

With regard to physical resources in the NR system, an antenna port, a resource grid, a resource element, a resource block, a carrier part, etc. may be considered.

The above physical resources that can be considered in the NR system are described in more detail below.

First, with regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be considered as being in a quasi co-located or quasi co-location (QC/QCL) relationship. The large-scale properties include at least one of delay spread, Doppler spread, frequency shift, average received power, and received timing.

FIG. 3 illustrates an example of a resource grid supported in a wireless communication system to which a method described in the disclosure is applicable.

Referring to FIG. 3, a resource grid consists of $N_{RB}^{\mu}N_{sc}^{RB}$ subcarriers on a frequency domain, each subframe consisting of $14 \cdot 2^{\mu}$ OFDM symbols, but the disclosure is not limited thereto.

In the NR system, a transmitted signal is described by one or more resource grids consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 4, one resource grid may be configured per numerology $\mu$ and antenna port p.

FIG. 4 illustrates examples of a resource grid per antenna port and numerology to which a method described in the disclosure is applicable.

Each element of the resource grid for the numerology $\mu$ and the antenna port p is called a resource element and is uniquely identified by an index pair (k,l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology $\mu$ and the antenna port p corresponds to a complex value $a_{k,l̄}^{(p,\mu)}$. When there is no risk for confusion or when a specific antenna port or numerology is not specified, the indexes p and $\mu$ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain. On the frequency domain, physical resource blocks are numbered from 0 to $N_{RB}^{\mu}-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \qquad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ on the frequency domain.

Self-Contained Slot Structure

In order to minimize data transmission latency in a TDD system, 5th generation (5G) new RAT (NR) considers a self-contained subframe structure as illustrated in FIG. 5.

That is, FIG. 5 illustrates an example of a self-contained structure to which a method described in the disclosure is applicable.

In FIG. 5, a hatched portion 510 represents a downlink control area, and a black portion 520 represents an uplink control area.

A non-hatched portion 530 may be used for downlink data transmission or for uplink data transmission.

Such a structure is characterized in that DL transmission and UL transmission are sequentially performed in one slot, and the transmission of DL data and the transmission and reception of UL ACK/NACK can be performed in one slot.

The slot described above may be defined as 'self-contained slot'.

That is, through such a slot structure, a base station can reduce the time it takes to retransmit data to a UE when a data transmission error occurs, and hence can minimize a latency of final data transfer.

In the self-contained slot structure, a time gap is necessary for the base station and the UE to switch from a transmission mode to a reception mode or to switch from the reception mode to the transmission mode.

To this end, some OFDM symbols at a time of switching from DL to UL in the self-contained slot structure are configured as a guard period (GP).

Analog Beamforming mmW enables installation of multiple antennas in the same area due to its reduced wavelength.

In other words, in the 30 GHz band, the wavelength is 1 cm, and a total of 100 antenna elements may be installed in a 2-dimensional array at every 0.5 lambda (wavelength, $\lambda$) interval in the 5-by-5 (cm) panel.

Hence, mmW increases coverage or throughput by raising beamforming (BF) gain by use of multiple antenna elements.

In this case, a transceiver unit (TXRU) to enable adjustment of transmission power and phase per antenna element allows for independent beamforming per frequency resource.

However, installation of TXRUs in all of the 100 antenna elements may be ineffective in light of costs.

Thus, a scheme being considered is to map multiple antenna elements to one TXRU and adjust the direction of beams with analog phase shifters.

Such analog beamforming scheme may create one beam direction over the entire band and is thus unable to achieve selective beamforming.

In the middle between digital BF and analog BF, there is considered a hybrid BF with B TXRUs which are fewer than Q antenna elements.

In this case, although there are differences in connections between B TXRUs and Q antenna elements, the number of beam directions in which simultaneous transmission is possible is limited to B or less.

In the next-generation system, the base station may allocate a time/frequency resource to the UE more flexibly than in the legacy system and, without limitations to the frequency domain of the UE, allocate an individual bandwidth part (BWP), as the system bandwidth, to the UE.

Different signalings may be used to receive resource allocations depending on the services with different quality-of-service (QoSs) used by the UEs.

For another UE, or even for one UE, the system needs to prioritize a specific service of traffic considering service-to-service requirements.

For a service requiring short latency and high reliability, the base station needs to more dynamically control the resources of the UEs that in the legacy system.

As compared with the legacy systems, the next-generation system (5G/NR) may simultaneously support several services, and one UE may be needed to simultaneously support several services. If the QoS is classified only at a level not less than Layer 2 (L2), it may be inappropriate for services requiring very short latency.

To support such service, L1 needs to be able to perform different operations depending on QoSs, and this may mean that L1 also needs a scheme in which the UE may discern the QoS requirement of each packet.

By performing such operation, 5G/NR may be able to process urgent data with a short interruption and minimum resource while supporting data for which the several QoS requirements are low.

Such services with different QoSs may undergo different procedures event at the physical layer level.

As an example, it may be considered to come up with a sufficiently low target frame error rate (FER) to secure high reliability at the hybrid automatic repeat and request (HARQ) retransmission level.

Since the UE performs uplink/downlink transmission according to L1 signaling from the base station, the base station needs to consider the L1 signaling upon allocating packet transmissions with different QoSs to the UE.

As more and more communication devices need larger communication capacity, a need is surfacing for mobile broadband communication enhanced over conventional radio access technology.

Massive machine type communication (MTC) becomes a major issue as considered for next-generation communication, which connects multiple devices and things anytime, anywhere to provide various services.

Also under discussion is a communication system design considering services/UEs sensitive to reliability and latency.

As such, there is ongoing discussion for next-generation radio access technology considering, e.g., enhanced mobile broadband communication, massive MTC, and ultra-reliable and low latency communication (URLLC), which is referred to herein as new RAT for convenience.

The next-generation system may use mini-slots in units of scheduling according to services and/or applications.

In the mini-slot, the time duration may be varied.

The number of the resource elements (REs) constituting the mini-slot may be varied.

Specifically, the number of the time and/or frequency resources of the mini-slot may be varied depending on, e.g., the number of the symbols constituting the mini-slot and/or subcarrier spacings.

The amount of available resources for actual data mapping may be time-varied depending on the presence or absence of a reference signal (RS), density, or the presence or absence of control information although the same scheduling unit is used.

In this case, the scheduling unit may be semi-static or be varied via higher layer signaling, or may be varied dynamically (e.g., by downlink control information (DCI) indication).

Further, upon applying the TDD in the next-generation system, the slot type (e.g., downlink, uplink, number of gap regions, or time duration) may be dynamically varied.

In such a circumstance, the number of available resource elements (REs) may be flexible per downlink (DL) or uplink (UL) in the scheduling unit (e.g., slot or mini-slot).

Thus, the range of sizes of transport blocks (TBs), which may be supported/transmitted by the UE, or its value may be diversified.

The available REs may include a specific control signal and/or reference signal (RS).

In this case, the available REs may be limited to data mapping purposes for measurement.

Method 1—Handling Different Target BLER and MCS Table

In the next-generation system, the UE may use multiple channel quality indicator (CQI) tables for multiple block error rates (BLERs) and modulation coding scheme (MCS) tables according to the higher layer signaling from the base station.

The UE may utilize such MCS table for each transmission.

For example, the base station may use a low target BLER (BLER target) upon initial transmission and a higher target BLER upon retransmission, so as to efficiently use resources while guaranteeing high reliability for the UE.

The following methods may be taken into consideration to allow the UE to use different MCS tables.

(Method 1-1)

Method 1-1 is a method of using different MCS tables depending on the format of the downlink control information (DCI) received by the UE from the base station.

For example, the base station may use a separate DCI format for URLLC transmission in which case an MCS table associated with a lower target BLER is used for the DCI format.

(Method 1-2)

Method 1-2 is a method of allowing the base station to explicitly indicate a specific one among multiple MCS tables using DCI.

In other words, the base station may add a field for indicating the specific MCS table to the DCI.

For example, an MCS table selection field including information for the MCS table may be added to the DCI, and the specific MCS table may be determined by the MCS table selection field value.

(Method 1-2-a)

As a specific operation of method 1-2 above, the MCS table selection field may include information resultant from joint-coding the redundancy version (RV) and the MCS table selection.

For example, the information included in the field may express RV (e.g., [RV0, RV1, RV2, RV3]) and MCS (e.g., [MCS0, MCS1]) in 2 bits, and this may be any one of (RV0, MCS0), (RV2, MCS1), (RV3, MCS1), and (RV1, MCS1).

As another example, retransmission may occur up to two times and, under the assumption of such an occasion, the information included in the field may be expressed using two bits, and this may be represented as one of, (RV0, MCS0), (RV2, MCS0), (RV0, MCS1), (RV2, MCS1) or (RV0, MCS0), (RV3, MCS0), (RV0, MCS1), and (RV3, MCS1).

Method 2—Maintain TBS Between Two Transmissions in URLLC

The CQI/MCS table for URLLC may have a different spectral efficiency (SE) interval from that of the CQI/MCS table for eMBB transmission.

For example, the base station may use a much lower SE to obtain a higher coding gain so as to meet a high level of reliability requirement in the signal-to-noise ratio (SNR) range of the same level as eMBB.

Here, the spectral efficiency means the number of bits that may be transmitted at 1 Hz.

In other words, having a high spectral efficiency refers to having a high data throughput in the same bandwidth.

Meanwhile, the base station may sometimes use a limited resource allocation (RA) scheme to raise the reliability of DCI transmission.

In this case, upon changing the MCS used upon retransmission from the base station to the UE, it may be hard to configure the RA to have the same transport block size (TBS).

For example, when the base station uses frequency domain resource allocation in a large resource block group (RBG) to reduce the DCI size, the base station may have difficulty in allocating the resources of the size in which the same TBS may be derived.

Unlike the legacy systems, the next-generation system derives the TBS via the code rate and the resource assigned the TBS. Thus, when the base station fails to perform proper resource allocation, different TBSs may be derived at a given code rate.

In such a case, since different TBSs may be derived in the DCI of initial transmission and retransmission, such a case may occur where the DCI is missing.

Thus, the following methods may be taken into consideration to derive the same TBS between the initial transmission and retransmission.

For example, upon initial transmission of the TBS of the TB used for retransmission, the UE may use the DCI received from the base station so as to keep it identical to the TBS size of the TB transmitted.

Specifically, the UE may use the DCI format for determining the TBS for TB transmission.

At this time, the respective formats of the DCI received upon retransmission and the DCI received upon initial transmission. If the DCI formats are identical to each other, the TBS is maintained as it is. upon retransmission and, if they are not identical to each other, the TBS used upon initial transmission may be used.

Specific methods for deriving the same TBS between initial transmission and retransmission are described below.

(Method 2-1)

Method 2-1 is a method by which the UE derives different TBSs depending on services, and/or applications, DCI formats, and/or DCI-associated target BLER/MCS tables.

For example, the UE may derive the TBS from the TBS table for a specific service and/or application, DCI format and/or DCI-associated target BLER.

(Method 2-2)

The legacy system uses quantization for each specific information bit size to keep the TBS of each transmission identical.

The information bit size may be determined by multiplying the product of the code rate determined by the DCI and the modulation order, by the number of layers.

However, the next-generation system may differ in URLLC CQI, MCS, and/or resource allocation method.

Despite a difference in resource allocation, a quantization method may be separately used to have the same TBS.

Thus, method 2-2 proposed in the disclosure is a method by which the UE has different TBS quantization steps depending on services and/or applications, DCI formats and/or DCI-associated target BLER and/or MCS tables.

Specific operations of method 2-2 are described below in greater detail.

(Method 2-2-a)

As compared with conventional methods, the methods proposed in the disclosure are methods for allowing the information bit size interval for selecting a quantization method to differ.

For example, while the legacy system uses a TBS table in 3,824 bits or less, the next-generation system may use more bits (e.g., 3,824 bits or more) or always use a TBS table in the case where the MCS/CQI table or DCI for URLLC is used.

Further, the legacy system uses different quantization steps in 3,824 bits and in 8,424 bits.

However, in the next-generation system, i.e., in the case of MCS table, CQI table and/or DCI for URLLC, a quantization step may be determined based on a smaller bit size.

This method makes the unit (granularity) of TBS determined to be coarser.

(Method 2-2-b)

Another method may be a method by which the UE limits the value used for quantization.

For example, the UE may apply a limited size of TBS table in the TBS quantization table used in legacy eMBB.

For example, the UE may apply a limited size of TBS table, such as using even-numbered entries, using odd-numbered entries, or using only every k entries.

Or, the UE may use a separate coarser TBS table for URLLC purposes.

(Method 2-2-c)

Another method may be a method for applying a larger quantization step than in the conventional methods.

For example, the UE may use the product of natural number k and the quantization step used in eMBB.

As an example, where eMBB uses 8*C, 8*k*C may be used.

Method 3—Maintain Base Graph Between Two Transmissions in URLLC

The next-generation system may use a plurality of control signals (including the ones which use different base graphs (BGs)).

In this case, the UE needs to maintain the same channel coding scheme between initial transmission and retransmission to perform appropriate chase combining and/or incremental redundancy (IR).

For example, it is needed to ensure that the base graph of low-density parity-check code (LDPC) should be maintained.

More specifically, the base graph may be varied depending on code rates.

In this case, DCI for initial transmission may be missed.

To ensure the same base graph even in such a case, the DCI transmitted from the base station to the UE needs to indicate information for the base graph.

Or, the UE may assume a specific base graph based on some information.

For example, the UE may assume to disregard retransmission DCI or use a specific base graph so as to maintain the same base graph for retransmission and initial transmission.

Described below are specific methods for assuming a specific base graph or indicating a specific base graph to maintain the base graph between initial transmission and retransmission.

(Method 3-1)

Method 3-1 is a method by which the UE assumes the base graph of previous transmission regardless of the modulation order or code rate upon when instructed to change the modulation order for the previous transmission/reception via DCI.

(Method 3-2)

When the UE receives the retransmission DCI, the base graph determined according to, e.g., the payload size or code rate of retransmission DCI or by the above-described method 3 may differ from the base graph for initial transmission.

In method 3-2, the UE may disregard the retransmission DCI, regard it as an error case, or may not assume reception of such retransmission DCI.

This method may simplify the UE's decoding/encoding process.

(Method 3-3)

In this method, the UE assumes that only one kind of base graph is used for a specific traffic type, HARQ process, resource region, or logical channel (LCH).

For example, it may be assumed that upon receiving the DCI for TB transmission/reception of URLLC traffic, the UE uses only base graph 2 of base graph 1 and base graph 2.

This method may be advantageous in obtaining the processing time of worst case of a certain service.

This method may also be advantageous in low-latency transmission/reception by saving the overall time line of UE operations.

(Method 3-3-a)

The base graph determined according to the payload size or code rate of the DCI received when the UE assumes a specific base graph or the base graph determined by the above-described method 3 may differ from the assumed base graph.

Method 3-3-a is a method by which the UE may disregard the DCI, regard it as an error case, or may not assume reception of such DCI.

(Method 3-4)

The UE may assume that only a specific base graph is used for the slot offset value and/or code book, PUCCH resource, QoS target BLER, RNTI, or service type given by higher layer signaling or a specific DCI format and/or L1 signaling including a service indicator.

It may be possible to efficiently specify the base graph of TBS or low-density parity check (LDPC) without ambiguity when various target BLER and CQI/MCS tables are used when the UE and the base station perform low-latency transmission which has high reliability.

It is also possible to perform communication by efficiently taking advantage of resources using multiple target BLER and MCS/CQI tables.

In particular, in the case where resource allocation and MCS/TBS determination are performed with downlink control information with a small bit size to guarantee high reliability, even when the time/frequency resource allocation unit (granularity) is insufficient or the downlink control information of initial transmission is missing, it may be possible to assume a base graph of the same TBS and LDPC code as initial transmission.

The above-described embodiments or methods may be performed separately or in combination, thereby implementing a method as proposed herein.

FIG. 6 is a flowchart illustrating a method of operation of a UE performing a method for transmitting a TB as proposed in the disclosure.

In other words, FIG. 6 illustrates a method of operation of a UE transmitting a transport block (TB) using downlink control information (DCI) in a wireless communication system.

First, the UE receives first DCI from the base station (S610).

The UE selects a modulation and coding scheme (MCS) table based on the first DCI (S620).

The first DCI may include a field indicating the MCS table, and the MCS table may be determined based on the field.

The field indicating the MCS table may be joint-coded with a redundancy version (RV).

The UE calculates a first transport block size (TBS) based on at least one any one of a format of the first DCI and the selected MCS table (S630).

The UE transmits a first TB to the base station according to the calculated first TBS (S640).

The first TBS may be identical to a second TBS of a second TB transmitted before the first TB is transmitted.

The format of the first DCI is identical to the format of a second DCI transmitted for transmitting the second TB. The second DCI may be transmitted before the first DCI is transmitted.

In step S630, a quantization method may be selected based on a predetermined criterion, and the first TBS may be selected using the selected quantization method.

The predetermined criterion may be set based on an information bit size.

The information bit size may be larger than 3,824 bits.

An example in which a method for transmitting a transport block (TB) using downlink control information (DCI) in a wireless communication system as proposed herein is implemented on a UE device is described below with reference to FIGS. 8 and 9.

A UE for transmitting a transport block (TB) using downlink control information (DCI) in a wireless communication system may include a radio frequency (RF) module for transmitting/receiving radio signals and a processor functionally connected with the RF module.

First, the processor of the UE controls the RF module to receive first DCI from a base station.

The processor controls the RF module to select a modulation and coding scheme (MCS) table based on the first DCI.

The first DCI may include a field indicating the MCS table, and the MCS table may be determined based on the field.

The field indicating the MCS table may be joint-coded with a redundancy version (RV).

The processor controls the RF module to calculate a first transport block size (TBS) based on at least one any one of a format of the first DCI and the selected MCS table.

The processor controls the RF module to transmit the first TB according to the selected first TBS.

The first TBS may be identical to a second TBS of a second TB transmitted before the first TB is transmitted.

The format of the first DCI is identical to the format of a second DCI transmitted for transmitting the second TB. The second DCI may be transmitted before the first DCI is transmitted.

The processor may control the RF module to select a quantization method based on a predetermined criterion and to select the first TBS using the selected quantization method.

The predetermined criterion may be set based on an information bit size.

The information bit size may be larger than 3,824 bits.

FIG. 7 is a flowchart illustrating a method of operation of a base station performing a method for receiving a TB as proposed in the disclosure.

In other words, FIG. 7 illustrates a method of operation of a base station receiving a transport block (TB) using downlink control information (DCI) in a wireless communication system.

First, the base station transmits first DCI to the UE (S710).

The base station receives, from the UE, a first TB according to a first transport block size (TBS) (S720).

The first TBS may be calculated based on at least any one of a format of the first DCI and a modulation and coding scheme (MCS) table selected based on the first DCI.

The first TBS may be identical to a second TBS of a second TB received from the UE before the first TB is received.

An example in which reception of a transport block (TB) using downlink control information (DCI) in a wireless communication system as proposed herein is implemented on a base station device is described below with reference to FIGS. 8 and 9.

A base station for receiving a transport block (TB) using downlink control information (DCI) in a wireless communication system may include a radio frequency (RF) module for transmitting/receiving radio signals and a processor functionally connected with the RF module.

First, the processor of the base station controls the RF module to transmit first DCI from a UE.

The base station controls the RF module to receive, from the UE, a first TB according to a first transport block size (TBS).

The first TBS may be calculated based on at least any one of a format of the first DCI and a modulation and coding scheme (MCS) table selected based on the first DCI. The first TBS may be identical to the second TBS of the second TB received from the UE before the first TB is received.

Overview of Device to which the Disclosure is Applicable

FIG. 8 illustrates a block configuration diagram of a wireless communication device to which methods described in the disclosure are applicable.

Referring to FIG. 8, a wireless communication system includes a base station 810 and multiple UEs 820 located in an area of the base station.

Each of the base station 810 and the UE 820 may be represented as a wireless device.

The base station 810 includes a processor 811, a memory 812, and a radio frequency (RF) unit 813. The processor 811 implements functions, processes, and/or methods described in FIGS. 1 to 17. Layers of radio interface protocol may be implemented by the processor 811. The memory 812 is connected to the processor 811 and stores various types of information for driving the processor 811. The RF unit 813 is connected to the processor 811 and transmits and/or receives radio signals.

The UE 820 includes a processor 821, a memory 822, and a RF unit 823.

The processor 821 implements functions, processes, and/or methods described in FIGS. 1 to 7. Layers of radio interface protocol may be implemented by the processor 821. The memory 822 is connected to the processor 821 and stores various types of information for driving the processor 821. The RF unit 823 is connected to the processor 821 and transmits and/or receives radio signals.

The memories 812 and 822 may be inside or outside the processors 811 and 821 and may be connected to the processors 811 and 821 through various well-known means.

Further, the base station 810 and/or the UE 820 may have a single antenna or multiple antennas.

FIG. 9 illustrates another block configuration diagram of a wireless communication device to which methods described in the disclosure are applicable.

Referring to FIG. 9, a wireless communication system includes a base station 910 and multiple UEs 920 located in an area of the base station. The base station 910 may be represented by a transmitter, and the UE 920 may be represented by a receiver, or vice versa. The base station 910 and the UE 920 respectively include processors 911 and 921, memories 914 and 924, one or more Tx/Rx RF modules 915 and 925, Tx processors 912 and 922, Rx processors 913 and 923, and antennas 916 and 926. The processors implement functions, processes, and/or methods described above. More specifically, in DL (communication from the base station to the UE), an upper layer packet from a core network is provided to the processor 911. The processor implements functionality of the L2 layer. In the DL, the processor provides multiplexing between a logical channel and a transport channel and radio resource allocation to the UE 920 and is also responsible for signaling to the UE 920. The transmit (Tx) processor 912 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 916 via a separate Tx/Rx module (or transceiver 915). Each Tx/Rx module may modulate an RF carrier with a respective spatial stream for transmission. At the UE, each Tx/Rx module (or transceiver 925) receives a signal through the respective antenna 926 of each Tx/Rx module. Each Tx/Rx module recovers information modulated onto an RF carrier and provides the information to the receive (Rx) processor 923. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that were originally transmitted by the base station on the physical channel. The corresponding data and control signals are provided to the processor 921.

UL (communication from the UE to the base station) is processed at the base station 910 in a manner similar to the description associated with a receiver function at the UE 920. Each Tx/Rx module 925 receives a signal through the respective antenna 926. Each Tx/Rx module provides an RF carrier and information to the Rx processor 923. The processor 921 may be associated with the memory 924 that stores a program code and data. The memory may be referred to as a computer readable medium.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational interpretation of the appended claims, and all modifications within an equivalent scope of the disclosure are included in the scope of the disclosure.

INDUSTRIAL APPLICABILITY

Although the disclosure has been described focusing on examples applying to the 3GPP LTE/LTE-A/NR system, it can be applied to various wireless communication systems other than the 3GPP LTE/LTE-A/NR system.

The invention claimed is:

1. A method for transmitting a transport block (TB) in a wireless communication system, the method performed by a user equipment (UE) and comprising:
   receiving, from a base station, a first downlink control information (DCI);
   selecting a modulation and coding scheme (MCS) table based on the first DCI;
   calculating a first transport block size (TBS) based on at least one any one of a format of the first DCI and the selected MCS table; and
   transmitting, to the base station, a first TB based on the calculated first TBS,
   wherein the first TBS is identical to a second TBS of a second TB transmitted before the first TB is transmitted,
   wherein, based on a code rate related to the first TBS, a base graph of a low-density parity-check code (LDPC) related to the first TB is determined as i) a base graph 1, or ii) a base graph 2 different from the base graph 1, and
   wherein, (i) based on the first TB being related to a specific logical channel for ultra-reliable and low latency communications (URLLC) and (ii) based on the first TB being related to a retransmission of the second TB, the base graph of the LDPC related to the first TB is determined as the base graph 2 which is same as a base graph of a LDPC related to the second TB, regardless of the code rate related to the first TBS.

2. The method of claim 1, wherein the first DCI includes a field indicating the MCS table, and wherein the MCS table is selected based on the field.

3. The method of claim 2, wherein the field indicating the MCS table is joint-coded with a redundancy version (RV).

4. The method of claim 1, wherein a format of the first DCI is identical to a format of a second DCI transmitted for transmitting the second TB, and wherein the second DCI is transmitted before the first DCI is transmitted.

5. The method of claim 1, wherein calculating the first TBS includes:
selecting a quantization method based on a predetermined criterion; and
calculating the first TBS using the selected quantization method.

6. The method of claim 5, wherein the predetermined criterion is set based on an information bit size.

7. The method of claim 6, wherein the information bit size is larger than 3,824 bits.

8. A user equipment (UE) transmitting a transport block (TB) in a wireless communication system, the UE comprising:
a radio frequency (RF) module including a transceiver for transmitting/receiving a radio signal; and
a processor functionally connected with the RF module, wherein the processor is configured to:
receive, from a base station, a first downlink control information (DCI) from a base station;
select a modulation and coding scheme (MCS) table based on the first DCI;
calculate a first transport block size (TBS) based on at least one any one of a format of the first DCI and the selected MCS table; and
transmit, to the base station, a first TB based on the calculated first TBS, and
wherein the first TBS is identical to a second TBS of a second TB transmitted before the first TB is transmitted,
wherein, based on a code rate related to the first TBS, a base graph of a low-density parity-check code (LDPC) related to the first TB is determined as i) a base graph 1, or ii) a base graph 2 different from the base graph 1, and
wherein, (i) based on the first TB being related to a specific logical channel for ultra-reliable and low latency communications (URLLC) and (ii) based on the first TB being related to a retransmission of the second TB, the base graph of the LDPC related to the first TB is determined as the base graph 2 which is same as a base graph of a LDPC related to the second TB, regardless of the code rate related to the first TBS.

9. The UE of claim 8, wherein the first DCI includes a field indicating the MCS table, and wherein the MCS table is determined based on the field.

10. The UE of claim 9, wherein the field indicating the MCS table is joint-coded with a redundancy version (RV).

11. The UE of claim 8, wherein a format of the first DCI is identical to a format of a second DCI transmitted for transmitting the second TB, and wherein the second DCI is transmitted before the first DCI is transmitted.

12. The UE of claim 8, wherein the processor:
selects a quantization method based on a predetermined criterion; and
calculates the first TBS using the selected quantization method.

13. The UE of claim 12, wherein the predetermined criterion is set based on an information bit size.

14. The UE of claim 13, wherein the information bit size is larger than 3,824 bits.

15. A method for receiving a transport block (TB) in a wireless communication system, the method performed by a base station and comprising:
transmitting, to a user equipment (UE), a first downlink control information (DCI); and
receiving, from the UE, a first TB based on a first transport block size (TBS), wherein the first TBS is calculated based on at least any one of a format of the first DCI and a modulation and coding scheme (MCS) table selected based on the first DCI,
wherein the first TBS is identical to a second TBS of a second TB received from the UE before the first TB is received,
wherein, based on a code rate related to the first TBS, a base graph of a low-density parity-check code (LDPC) related to the first TB is determined as i) a base graph 1, or ii) a base graph 2 different from the base graph 1, and
wherein, (i) based on the first TB being related to a specific logical channel for ultra-reliable and low latency communications (URLLC) and (ii) based on the first TB being related to a retransmission of the second TB, the base graph of the LDPC related to the first TB is determined as the base graph 2 which is same as a base graph of a LDPC related to the second TB, regardless of the code rate related to the first TBS.

* * * * *